No. 772,374. PATENTED OCT. 18, 1904.
E. T. ROBBINS.
SPRING WHEEL.
APPLICATION FILED MAR. 7, 1904.
NO MODEL. 3 SHEETS—SHEET 1.
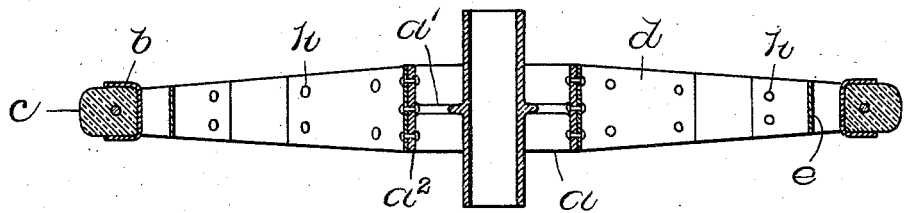
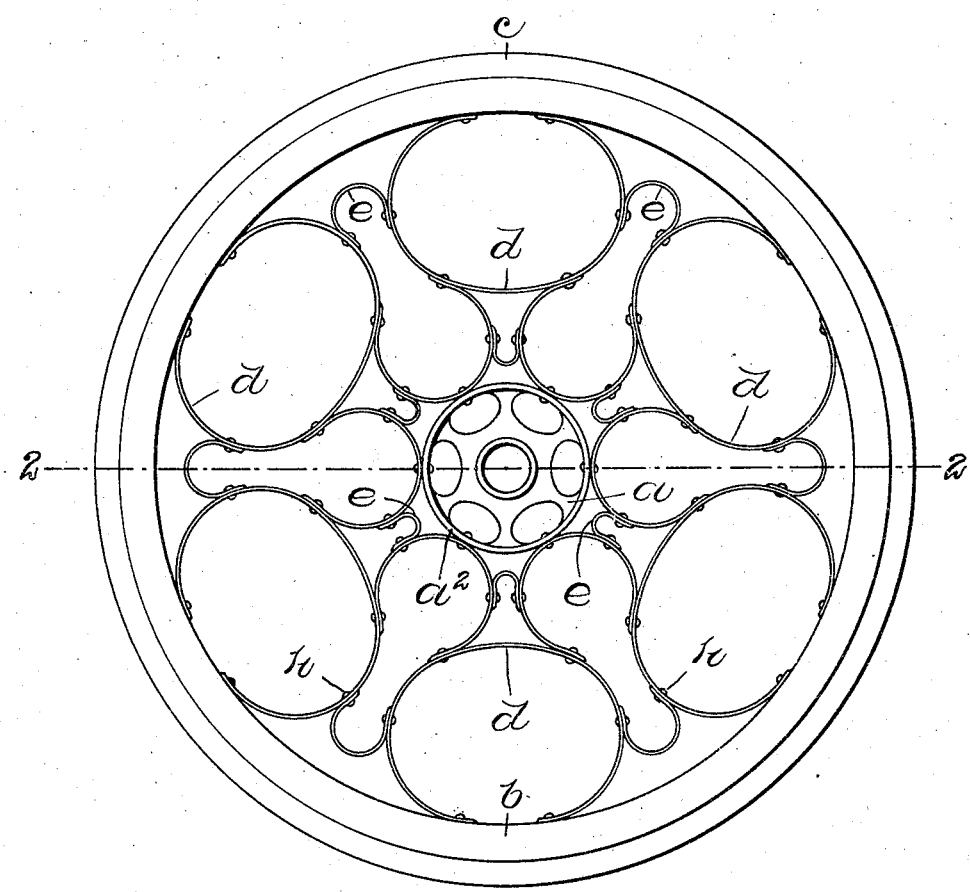

No. 772,374. PATENTED OCT. 18, 1904.
E. T. ROBBINS.
SPRING WHEEL.
APPLICATION FILED MAR. 7, 1904.
NO MODEL. 3 SHEETS—SHEET 2.
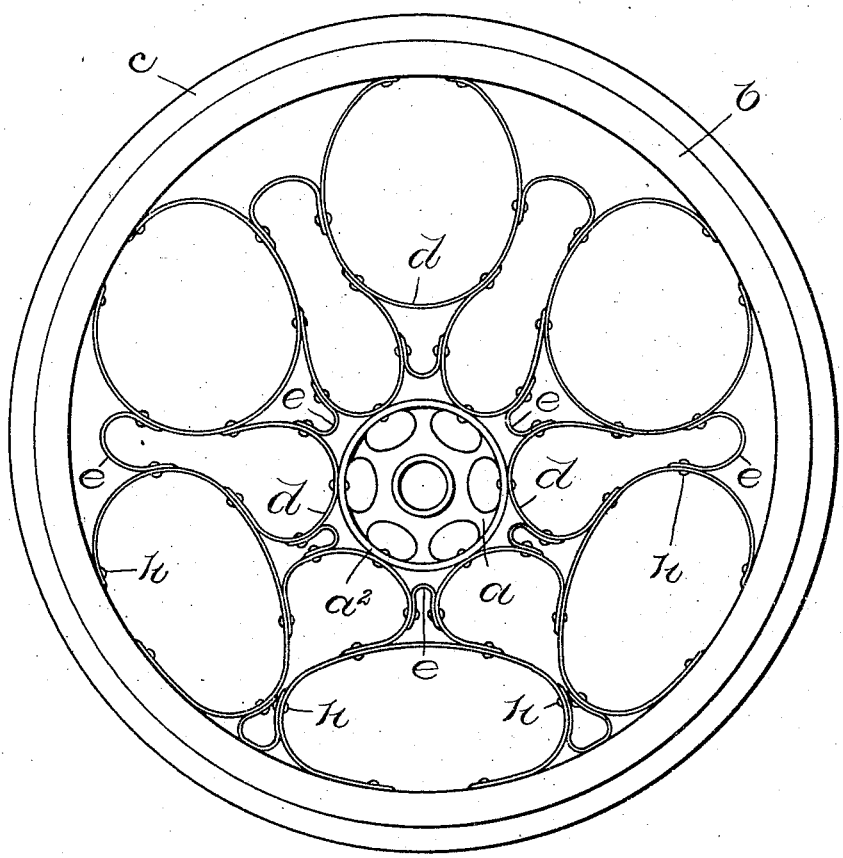
Fig. 3.
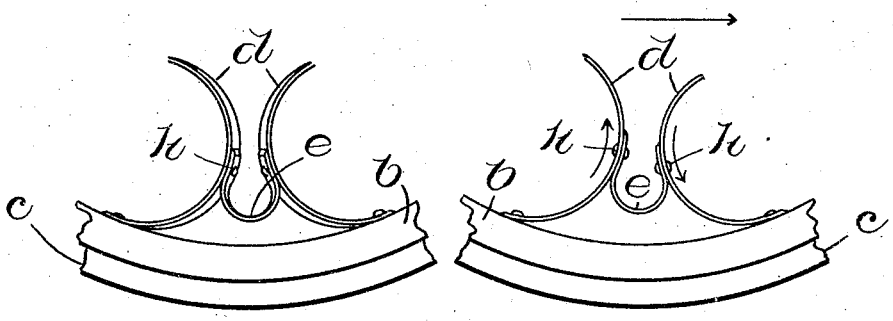
Witnesses: Fig. 4. Fig. 5. Inventor:

No. 772,374. PATENTED OCT. 18, 1904.
E. T. ROBBINS.
SPRING WHEEL.
APPLICATION FILED MAR. 7, 1904.
NO MODEL. 3 SHEETS—SHEET 3.
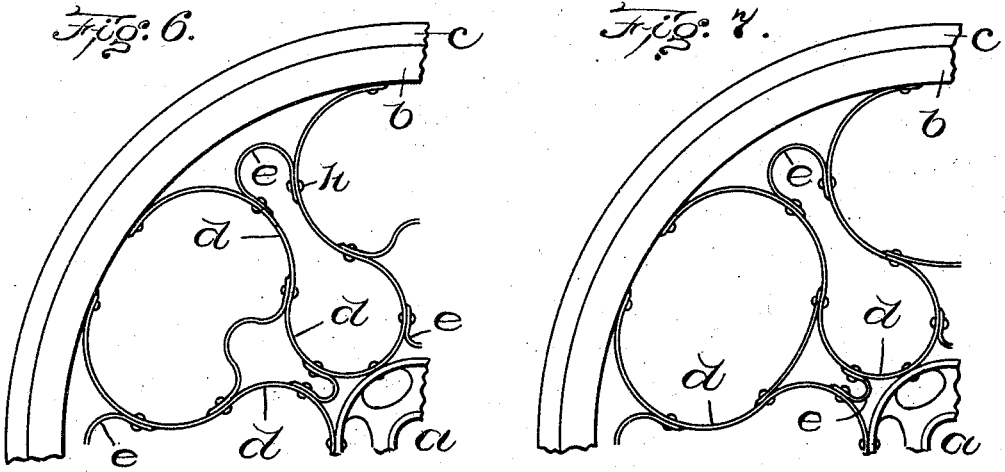
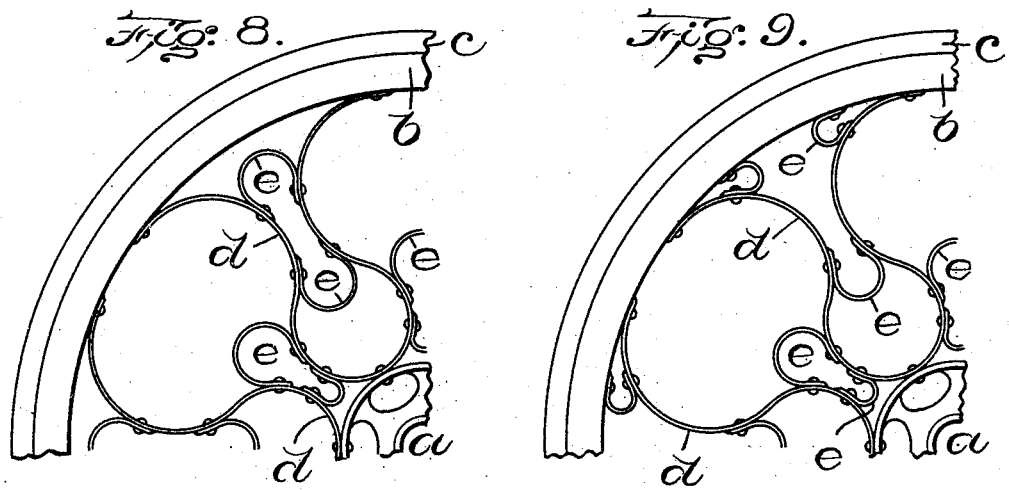
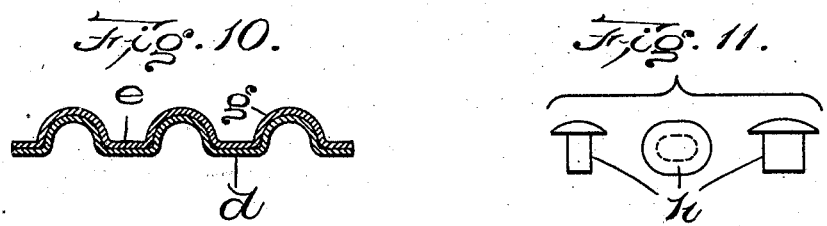
Witnesses:
A. D. Harriman
E. P. Batchelder
Inventor;
E. T. Robbins
by Wright, Brown & Quinby
Attorneys.

No. 772,374. Patented October 18, 1904.

UNITED STATES PATENT OFFICE.

EDWIN T. ROBBINS, OF SPRINGFIELD, MASSACHUSETTS.

SPRING-WHEEL.

SPECIFICATION forming part of Letters Patent No. 772,374, dated October 18, 1904.

Application filed March 7, 1904. Serial No. 196,835. (No model.)

*To all whom it may concern:*

Be it known that I, EDWIN T. ROBBINS, of Springfield, in the county of Hampden and State of Massachusetts, have invented certain new and useful Improvements in Spring-Wheels, of which the following is a specification.

My invention relates to spring-wheels of that type in which the resilience is obtained by means of a series of springs located between and connecting the hub and rim of the wheel.

One of the objects of the invention is to provide a wheel of this character in which the springs are radially resilient, yet so proportioned as properly to resist all strains tending to displace the hub either from its central position in relation to the rim or from its position in the same plane with that of the rim.

Another object of the invention is to provide a wheel of this character in which all side strains and driving strains will be efficiently taken up and compensated for.

Another object of the invention is to provide a wheel with all required resilience between the rim and the hub in order to render it possible to employ more durable tires than those now commonly used in automobiles, bicycles, and other vehicles.

In carrying out my invention I provide the wheel with a flexible body in such a manner and of such material and construction as to enable the wheel to perform not only the ordinary functions of a rigid wheel, but also to possess sufficient radial and lateral elasticity and flexibility to act as a cushion to protect the body of the vehicle from the shocks and blows incidental to a high rate of speed along a rough road. The wheel is also so constructed that it is sufficiently stiff and capable of sustaining the weight of the vehicle to prevent collapse when the rim of the wheel is forced out of its normal plane, as in changing its direction of motion at a high rate of speed or striking a glancing blow.

As a whole, the wheel, although resilient, has all of its portions so connected that all act as a unit in resisting displacement of hub or rim from its proper location. The spoke-springs, whether superimposed or continuous between hub and rim, join the latter directly. The equalizer-springs do not connect hub and rim, but join the spoke-springs together, except in the form shown in Fig. 9, where one set of them join spoke-springs to rim.

Of the accompanying drawings, forming a part of this specification, Figure 1 represents a side elevation of a wheel embodying my invention. Fig. 2 represents a section on line 2 2 of Fig. 1. Fig. 3 represents an elevation of a wheel having the same construction as that represented in Fig. 1, but illustrating extreme displacement of the hub and of the springs relatively to the rim when the pressure upon the hub becomes excessive. Fig. 4 represents a detail of a portion of a wheel hereinafter described. Fig. 5 represents another detail of the same or a similar portion of the wheel as that shown in Fig. 4, and which figure will be more fully referred to hereinafter. Figs. 6, 7, 8, and 9 are elevations of portions of wheels embodying slightly-modified constructions of the springs. It will be understood that in each of these figures the portions of each wheel not shown will simply be a continuation of the structure illustrated. Fig. 10 represents an enlarged section through any spoke-spring and equalizer-spring at a point where said two springs overlap and are in contact. This figure illustrates a modification which may or may not be employed. Fig. 11 represents in three different detail views a preferred form of rivet that may be employed.

Similar reference characters indicate the same or similar parts throughout the several views.

The hub is represented at $a$, the rim at $b$, and the tire at $c$. The spoke-springs $d$, which connect the hub and rim, may be of different forms, as hereinafter described, equalizer or compensator springs $e$ being interposed between and alternating with different portions of the spoke-springs.

The springs $d$, which join the rim and the hub, are herein referred to as "spoke-springs," because they take the place of the ordinary rigid spokes employed. Said springs $d$ may consist, as shown in Figs. 1 and 3, of an outer series of strips of suitable spring metal having their ends riveted to the rim and curved from end to end. The outer series of springs $d$ are connected to the hub by other spoke-springs, forming an inner series, each of which is shorter than the strips forming the outer series. In other words, the outer series are composed of larger springs, while the inner series are composed of small ones, so far as concerns their length. Preferably, however, as indicated in Fig. 2, the springs taper in width from the hub to the rim.

While I have shown the spoke-springs as superimposed in two concentric series in Fig. 1, they may be continuous between the hub and rim, as shown in Figs. 6 to 9, inclusive, without departing from the spirit of my invention. I also wish it to be understood that I do not limit myself to the exact curvatures shown, as they may be somewhat longer or shorter or may vary in number.

The spoke-springs are secured together by means of the relatively small U-shaped equalizer-springs $e$, which will ordinarily be placed in the particular spandrels between the spoke-springs, as shown in the drawings. When a strain is thrown on the hub or rim of the wheel, there is a tendency to twist the spoke-springs at the rivet-joints. To obviate this to secure lighter contruction and strengthen the wheel sidewise, the springs where they are overlapped and riveted may be fluted or corrugated, as indicated at $g$ in Fig. 10. In order to avoid the removal of much metal of the springs in riveting and consequent loss of strength, I prefer to employ rivets which are non-circular in cross-section, such as the oval-shaped rivets indicated in Fig. 11. These rivets will be employed so that the greatest diameter of the rivet-hole will be in the direction of the length of the spring-stock. The method of fastening the spring-body, rim, and hub together may vary as experience dictates, whether by the use of round or non-circular rivets, spring-clips, or otherwise.

The function of the small equalizer-springs is to cause the entire system or series of springs forming the body of the wheel to act in unity in resisting movement of the hub relatively to the rim, all of the springs being circumferentially connected with each other. This structure when from any cause there is a tendency to change the form of the wheel or displace the hub from the center of the wheel tends to restore the wheel to its normal form in the same manner as a solid rubber wheel-body would do. Any alteration of shape is communicated to all the spoke-springs of the series through the equalizer-springs.

I prefer to employ a hub having a form substantially as shown in Fig. 2, comprising an outer cylindrical portion to receive springs and an inner or hub body, the latter receiving the axle and being connected by a radial web $a'$, supported by cross-webs, if desired, for lateral strength. The radial web may be formed with perforations, which result in forming a lighter structure and also permit a more ready access for riveting purposes. The outer cylindrical portion of the hub practically forms a circular flange $a^2$, to which the central portions of the inner spoke-springs are riveted. When the wheel is in use, it is subject to three strains—radial, lateral, and circumferential. The practical success of a wheel of this character must depend upon the proper adjustment of strength of the springs to meet these strains. As the lateral strains are more liable to be disastrous than others, I preferably meet such lateral strains by increasing the width or the thickness, or both, toward the center of the wheel, such increase in width being indicated in Fig. 2, the equalizer-springs being of vital aid to the spoke-springs in securing necessary lateral strength.

It will be readily seen by comparing either of Figs. 6, 7, 8, and 9 with Fig. 1 that practically the only difference in the construction represented in the said Figs. 6 to 9, inclusive, is that the spoke-springs, while retaining the same shape, curved somewhat in the form of two connected ogee curves, have an equalizer substituted for the inner portion of the outer spoke-spring, the center of each spring $d$ being riveted to the hub and each spoke-spring running all the way from rim to hub and back to rim. As shown by said Figs. 6 to 9, inclusive, the equalizer-springs $e$ may be somewhat variously placed. In every case, however, the equalizer-springs perform the same function of resisting side strains, circumferential strains, and radial strains. They yield most, however, to the latter, as is essential to produce a spring-wheel.

The operation of the springs under extreme jolting strains is shown in Fig. 3, in which the hub is represented as deflected below the center of the wheel to a point where the lower spoke-springs of the outer series are in circumferential contact. This is a feature of importance, as it results in providing a practical limit to which the hub might yield in case of a severe jolt. It will be readily understood from said Fig. 3 that as the hub moves from the center farther toward the point shown in said Fig. 3 the spring resistance continues to increase in suitable proportion to the strain, the entire series of springs acting as a unit against such movement.

The lateral strains, as when the wheel strikes a stone at an angle, tend to twist the spoke-springs out of the plane of the wheel, as indicated in Fig. 4. The equalizer-springs, however, efficiently help the spoke-springs to resist such strains by holding the spoke-springs in the plane of the wheel, thus giving the wheel a lateral strength, which is an absolute practical necessity.

Under circumferential strains, as in the drive-wheels of a motor-car or the rear wheel of a bicycle or when applying a brake, the spoke-springs tend to roll on the rim. Suppose the wheel is driving the car in the direction of the horizontal arrow in Fig. 5. Then one spoke-spring member will tend to roll downward with the right-hand lower arrow while the adjacent member is tending to roll up in the direction of the left-hand lower arrow. Such action takes place in all the spoke-springs, both at the hub and the rim; but the tendency is efficiently resisted by the equalizer-springs, which tend to oppose any such rolling movement, as well as the movement of the spoke-springs toward and from each other or in a direction out of the plane of the wheel.

In each form or embodiment of the invention illustrated the wheel includes a series of connected springs interposed between the hub and the rim, each individual spring being so curved that it will oppose a change of form of either or any spring adjacent thereto. Moreover, the springs alternately vary in form and size, and each spring is curved in a direction which is the reverse of the direction of curvature of each adjacent spring. These features of the wheel result as a whole in attaining practically the same results as would be afforded if the wheel were made of a solid body of elastic material, such as rubber.

In each form the equalizer or compensator springs $e$ constitute yielding connections between the spoke-springs, which connections yield radially with any radial movements of the portions of said spoke-springs to which the equalizer-springs are connected. Moreover, the said spoke-springs and the equalizer-springs or radially-yielding connections are firmly joined or united, as by means of the rivet described, so that there can be no sliding movement of any spring relatively to or upon any equalizer-spring or yielding connection. Obviously if the equalizer-springs simply rested against the spoke-springs without being firmly joined or united thereto there could be no practical resistance afforded by the equalizer-springs against change of form of the spoke-springs further than would be obtained by simply making the spoke-springs thicker at some points. As above stated, my construction is such that each and every spring of the entire structure opposes a change of form in any direction of either spring that is adjacent thereto.

Having thus explained the nature of the invention and described a way of constructing and using the same, although without having attempted to set forth all the forms in which it may be embodied or all the modes of its use, I declare that what I claim is—

1. A spring-wheel comprising a hub, a rim, and a series of springs interposed between the hub and rim, said springs being joined by yielding equalizer connections, all of the springs and yielding connections being curved and alternately varying in form and size, said springs and connections being firmly joined or united to prevent relative sliding movements.

2. A spring-wheel including in its construction a series of springs and yielding equalizer connections circumferentially united to said springs, each spring of the entire series being formed to resist movement of the hub relatively to the rim, said springs and connections being firmly joined or united to prevent relative sliding movements.

3. A spring-wheel including in its construction a series of springs and yielding equalizer connections circumferentially united to said springs, each spring of the entire series being curved in a reverse direction relative to each adjacent spring, said springs and connections being firmly joined or united to prevent relative sliding movements.

4. The combination, in a spring-wheel, of curved spoke-springs, equalizer-springs, a hub, a rim, and rivet-fastenings, the rivets being non-circular in cross-section.

5. The combination, in a spring-wheel, of beaded, curved spoke-springs, equalizer-springs, rivet-fastenings which are non-circular in cross-section, a hub, and a rim, all substantially as set forth.

6. The combination, in a spring-wheel, of curved spoke-springs, rivet-fastenings which are non-circular in cross-section, a hub, and a rim, all substantially as set forth.

7. The combination, in a spring-wheel, of outer spoke-springs, both ends of each of which are attached to the rim, inner spoke-springs, each end of which is attached to one of the large spoke-springs and the middle of each of which is fastened to the hub, U-shaped equalizer-springs, each of which is situated in one of the spandrels formed by the spoke-springs, rim, and hub, and each end of which is fastened to a spoke-spring, a hub, and a rim, all substantially as described.

8. The combination, in a spring-wheel, of united curved spoke-springs, equalizer-springs, a hub and a rim, all substantially as set forth, the said spoke-springs and equalizer-springs being firmly joined or united to prevent relative sliding movements.

9. The combination, in a spring-wheel, of united, beaded, curved spoke-springs, equalizer-springs, a hub, and a rim, all substantially as set forth.

10. The combination, in a spring-wheel, of united, superimposed curved spoke-springs, each individual spring being open toward the rim, a hub and a rim, all substantially as set forth.

11. The combination, in a spring-wheel, of a series of spoke-springs and equalizer-springs, every individual spring in the wheel being open in one direction, a rim and a hub, all united together, substantially as set forth.

12. The combination, in a spring-wheel, of a single series of spoke-springs, both ends of each of which are attached to the rim, and the middle of each of which is attached to the hub, U-shaped equalizer-springs, each of which is situated in one of the spandrels formed by the spoke-springs, rim, and hub, and each end of each of which is fastened to a spoke-spring, a hub, and a rim, all substantially as described.

In testimony whereof I have affixed my signature in presence of two witnesses.

EDWIN T. ROBBINS.

Witnesses:
 ALLEN WEBSTER,
 MICHAEL GRIFFIN.